March 10, 1953

W. A. ESCHENBURG 2,630,845

WORK GAUGE FOR MACHINE TOOLS

Filed July 7, 1948

INVENTOR
William A. Eschenburg

By Strauch & Hoffman
Attorneys

March 10, 1953 W. A. ESCHENBURG 2,630,845
WORK GAUGE FOR MACHINE TOOLS
Filed July 7, 1948 3 Sheets-Sheet 2

INVENTOR
William A. Eschenburg
By Strauch & Hoffman
Attorneys

March 10, 1953  W. A. ESCHENBURG  2,630,845
WORK GAUGE FOR MACHINE TOOLS
Filed July 7, 1948  3 Sheets-Sheet 3

INVENTOR
William A. Eschenburg

By Strauch & Hoffman
Attorneys

Patented Mar. 10, 1953

2,630,845

UNITED STATES PATENT OFFICE 2,630,845

WORK GAUGE FOR MACHINE TOOLS

William A. Eschenburg, Freeport, Ill., assignor to Rockwell Manufacturing Company, Pittsburgh, Pa., a corporation of Pennsylvania Application July 7, 1948, Serial No. 37,461

2 Claims. (Cl. 143—176)

This invention relates to work gauges for machine tools, and more particularly to a work gauge or fence assembly for circular saw machines, of the type disclosed in the patent to Arthur J. Aumann 2,265,335 issued December 9, 1941.

It is the general object and purpose of the present invention to provide certain improvements in this patented rip gauge assembly consisting of an improved construction and assembly of the rear end supporting bracket for the gauge bar and the means for locking said bracket in fixed adjusted position relative to the table.

With the above and other objects in view, the invention resides in the improved work gauge for machine tools and in the form construction and relative arrangement of its several parts as will hereinafter be more fully described, illustrated in the accompanying drawings and subsequently claimed in the sub-joined claims.

In the drawings wherein I have shown one preferred practical embodiment of my invention, and in which similar reference characters designate corresponding parts throughout the several views.

Figure 1:
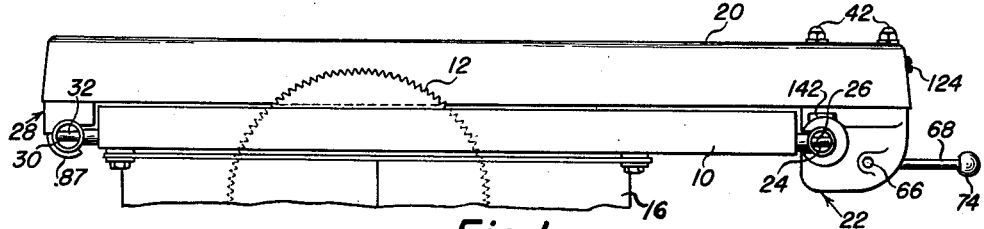
Figure 1 is a side elevation illustrating a selected embodiment of the invention in the form of a rip fence assembly for a circular saw.

Referring in further detail to the drawings, I have illustrated a preferred form of the invention as embodied in a rip gauge or fence assembly mounted on the work table 10 of a circular saw 12 which extends upwardly above the table surface through an insert plate 14 mounted in the table. The table is mounted in the usual manner upon suitable supporting means 16 and may be provided in its upper surface with the usual guide grooves, for a miter gauge.

The rip gauge or fence assembly includes the gauge bar 20 of substantially inverted U-shaped form in cross-section and of sufficient length to extend across the surface of the table 10 and beyond the front and rear edges thereof, said bar being closed at each end. The front end of this gauge bar is mounted upon a supporting bracket 22 in a manner to be later explained, said bracket being longitudinally adjustable upon a guide rail 24 extending along the front edge of the table 10 and rigidly fixed in spaced parallel relation thereto by means of suitable bolts 26. Preferably, this guide rail is of tubular cylindrical form.

A supporting bracket 28 for the rear end of the gauge bar 20 is similarly mounted for longitudinal sliding movement upon the cylindrical supporting rail 30 rigidly fixed to the rear edge of the table 10 by bolts 32. The brackets 22 and 28 support the gauge bar 20 on the guide rails 24 and 30 with the lower open side thereof in clearance relation to the upper surface of the table 10.

Figure 2:
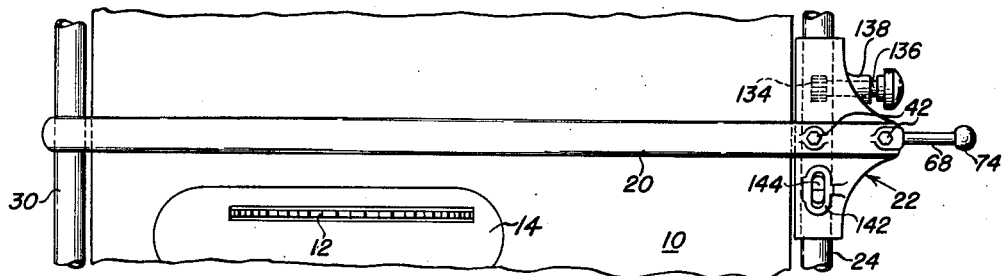
Figure 2 is a top plan view thereof.

As seen in Figure 2 of the drawings, the front supporting bracket 22 is of hollow elongated construction and extends laterally from each side of the gauge bar 20 and together therewith forms a T head assembly. This bracket at its upper end is provided with longitudinally spaced threaded openings to receive the threaded axially projecting studs 36 on the lower ends of the vertical posts 34 which extend upwardly from the bracket within the end of the gauge bar 20 and at their upper ends are provided with reduced axial extensions 38 projecting above the gauge bar through openings 40 in the top wall thereof. The upper ends of the extensions 38 are threaded and receive cap nuts 42 and locking washers 44 for said nuts. The openings 40 are slightly elongated transversely of the gauge bar. Thus the gauge bar may be angularly adjusted relative to the bracket 22 in a horizontal plane and then rigidly fixed in its adjusted position by the nuts 42 in accurately parallel relation with the plane of the saw blade 12.

Figure 5:
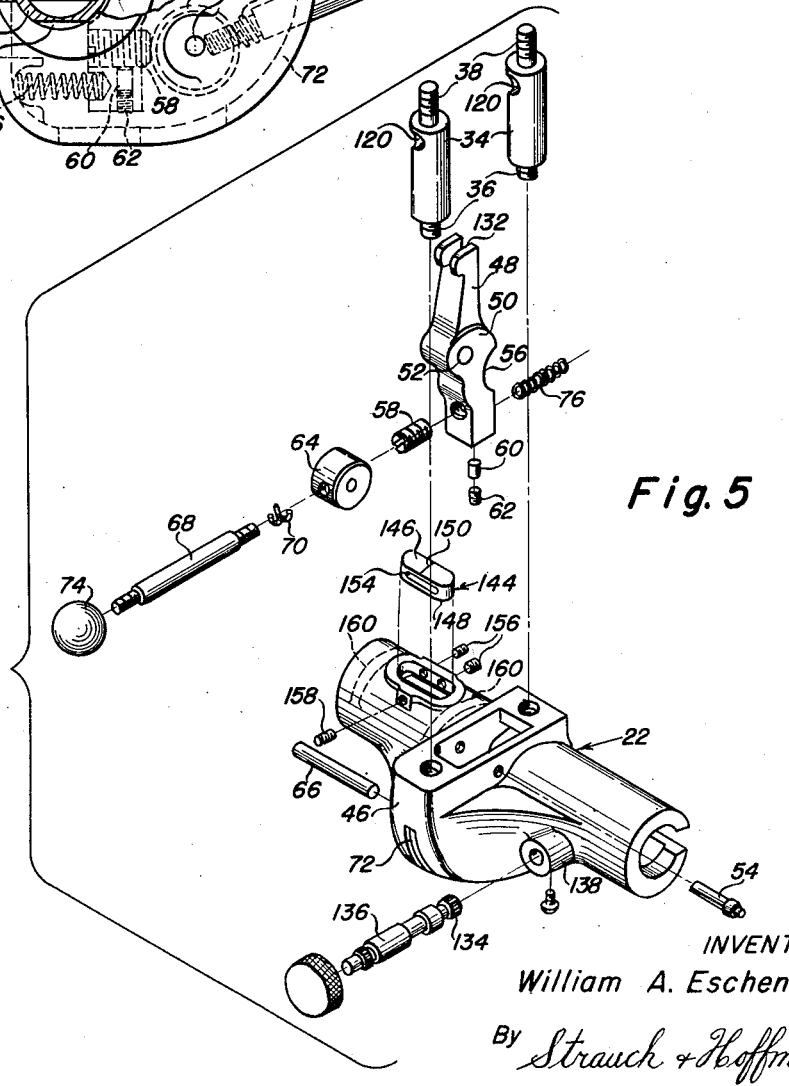
Figure 5 is an exploded perspective view of the front end supporting bracket for the gauge bar and parts associated therewith.
Figure 6:
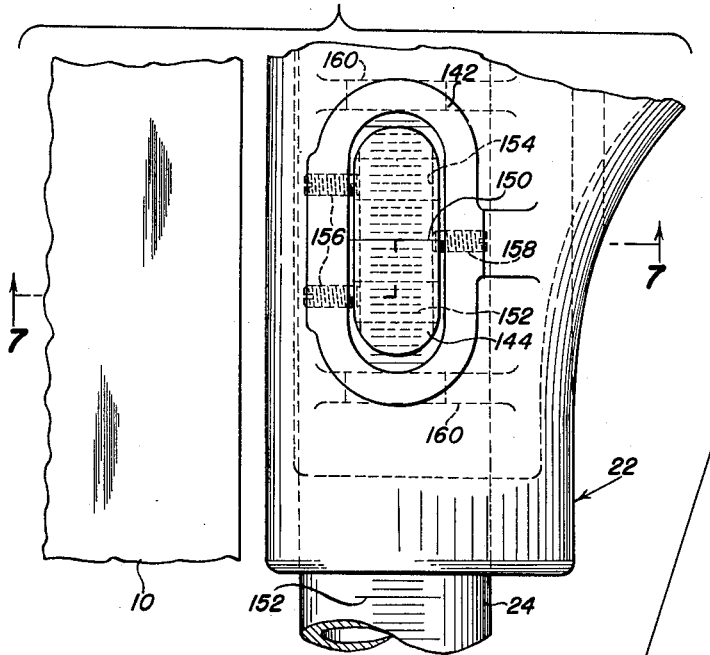
Figure 6 is an enlarged fragmentary plan view showing the mounting and arrangement of the magnifying lens on the adjustable front end bracket.

Within a central hollow body portion 46 (Figure 5) of the bracket 22 a vertically disposed locking lever 48 is mounted. As herein shown, this lever, substantially midway between its ends, is provided with an enlarged hub portion 50 having a large diameter bore or opening 52 relative to the diameter of a pin 54 which is disposed through said opening and fixed in any suitable manner in the opposite side walls of the body portion 46 of the bracket. The pin 54 is axially parallel with the guide rail 24 and located above and forwardly of said rail.

Below the pin 54 lever 48 is provided with an arcuate clamping surface 56 which engages the front peripheral surface of the guide rail 24 in the locking position of said lever. Below the surface 56, the lever 48 carries an adjustable plug 58 having its axis disposed at right angles to the axis of rail 24. The plug is locked in its adjusted position by means of the pin 60 and a screw 62 threaded in the lower end of a vertical bore in the lever and coacting with said pin.

The front end of plug 58 is engaged by a cam or eccentric 64 rotatably supported upon a pin 66 suitably fixed in the bracket and axially parallel with the pin 54. An actuating rod 68 has a threaded connection at one end with the eccentric 64 and is frictionally locked against casual turning movement relative to the eccentric by means of the spring 70. This rod 68 extends outwardly and forwardly through an arcuate slot 72 in the front wall of the bracket 22 and is provided at its forward end with a suitable hand knob 74.

Below the plug 58 a coiled spring 76 has its opposite ends seated in suitable recesses in the lever 48 and the rear wall of the bracket body respectively. This spring yieldingly holds the forward end of plug 58 in contact with the periphery of eccentric 64 and by the axial adjustment of the plug, the clamping pressure applied by the lever against the rail 24 may be properly regulated.

The rear end supporting bracket 28 for the gauge bar 20 also carries a device for locking the gauge bar in its adjusted position to the rail 30. As herein shown, this rear bracket 28 is relatively narrow and has a major width substantially equal to the width of the gauge bar 20. The end of the bar 20 is rigidly secured upon the rectangular base portion 78 of the bracket by means of a plurality of screws 80. This bracket base has a forward saddle portion provided with an arcuately concave surface 82 slidably seated upon the upper side of the guide rail 30. Rearwardly thereof the base 78 is formed with a vertically extending rectangular guide opening 84 for the locking rod 86 which has a forwardly projecting curved or hooked lower end portion 87 for clamping engagement against the underside of the rail 30. Above the base 78, the rod 86 extends axially upward within a vertical tubular boss or portion 88 of the bracket, said tubular portion being integrally connected at the front side thereof throughout its length with the base 78 by spaced parallel webs 90 between which the lower end portion of the tube wall is provided with a vertically extending slot 92.

A bell crank lever 94 is pivotally mounted upon a pin 96 suitably fixed at its ends in the bracket webs 90. The lower horizontal arm 98 of this lever extends rearwardly through the slot 92 and within the bifurcated upper end 100 of the locking rod 86 and in contact with the under side of a pin 102 connecting the spaced arms of said bifurcation. The rear end bracket 28 and locking device thus constitutes a sub-assembly unit that may be readily handled as a single element in assembly of the rip gauge or fence.

A compression spring 104 bears at its upper end against the top wall of the gauge bar 20 and extends downwardly therefrom into the upper end of the tubular portion 88 of bracket 28. A bearing cap member 106 within the lower end of this spring has contact upon the upper end of the locking rod 86 tending to urge said rod downwardly and rock lever 94 in an anti-clockwise direction and releasing the clamping pressure of the lower end 87 of said rod against the guide rail 30.

It will be noted that the uppermost portions of bracket 28 are wholly enclosed within the bar 20 without protruding fastening elements, such as bolt heads, so that in feeding the work to the saw the operator's hand may freely slide over the surface of the gauge bar.

For the purpose of actuating the front and rear locking devices to their locking positions in successive order in a single oscillation of eccentric 64 in one direction, the levers 48 and 94 are interconnected by a motion transmitting means, which in the present instance comprises a rod 108 extending longitudinally within the gauge bar 20. This rod at its rear end is flattened out transversely and has a longitudinally extending slot 110 in the flattened portion receiving the upper end of the vertical arm 112 of bell crank lever 94. Lever arm 112 has a notch 14 in its rear edge receiving the extremity of the rod 108 at the rear end of slot 110.

The gauge bar 20 in spaced relation from its forward end wall is internally formed with longitudinally spaced transverse webs 116 which, when the bar is assembled on bracket 22, are positioned between the vertical posts 34 on said bracket. These webs are provided with relatively large openings 118 in axial alignment with relatively diameter openings 120 in the posts 34 so as to freely pass the flattened end of rod 108. The forward end of rod 108 extends through the opening 120 in the rear post 34 and opening 118 in the adjacent web 116 and has a threaded terminal portion 122 engaged with the internally threaded end of the longitudinal bore 126 in a support sleeve 124 rotatably mounted in the opening 118 of the forward web 116 and a similar opening 128 in the forward end wall of the bar 20. A spring 130 in the bore 126 urges the rod 108 and sleeve 124 in opposite directions to frictionally lock the adjustable sleeve 124 to the threaded end 122 of rod 108.

Rearwardly of sleeve 124, the upper end of locking lever 48 is bifurcated, as at 132 (Figures 2 and 5), and loosely straddles the rod 108, there being sufficient lateral play to permit of the angular adjustment of gauge bar 20 relative to bracket 22 in the manner above described, for which purpose also the large diameter openings 120 in posts 34 are provided.

Figure 4:
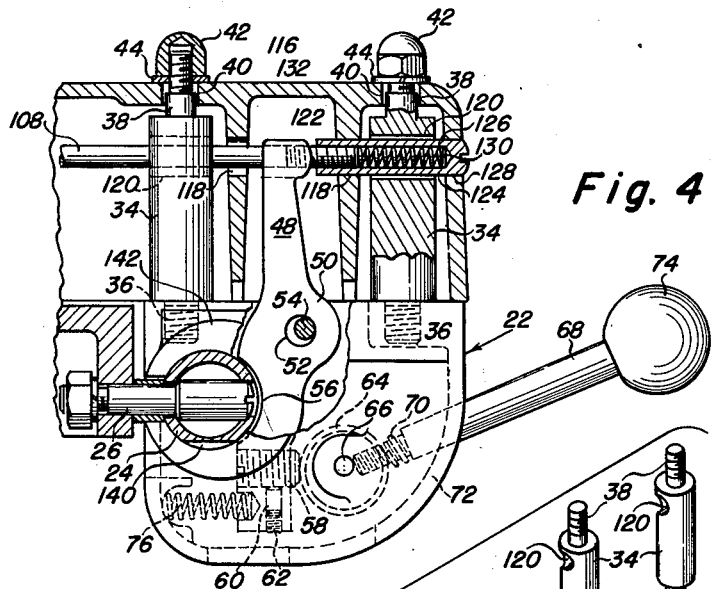
Figure 4 is a similar view of the front end locking device with the hand operated lever disposed in its unlocking position.

When the operating handle 68 and eccentric 64 are in the position shown in Figure 4 of the drawings, the brackets 22 and 28 together with gauge bar 20 may be freely moved along the guide rails 24 and 30 by means of a pinion 134 (Figure 2) on one end of shaft 136 journalled in a suitable bearing 138 provided on bracket 22 and in constant engagement with rack teeth 140 formed on the under side of rail 24.

In the assembly of gauge bar 20 and the front and rear brackets 22 and 28, the posts 34 are connected with the front bracket 22. The forward end of the gauge bar is then mounted on the bracket and secured by cap nuts 42. The assembled rod 108 and the sleeve 124 are now inserted in the gauge bar from the front end thereof, after which the upper structure of the rear bracket 28 with its assembled locking device and cap 106 and spring 104 in place is inserted upwardly into the rear end of the gauge bar. This assembly is facilitated by the longitudinally elongated slot 110 in the rear end of rod 108 through which the upper end of lever arm 112 may be readily inserted. The bracket base is then shifted rearwardly to position the rear extremity of rod 108 in notch 114 of the lever arm and the base is rigidly secured to the bar 20 by means of screws 80, thus completing the assembly.

In the operation of the above described assembly, assuming that the fence or gauge bar 20 has been properly adjusted on supporting bracket 22 after the front and rear brackets have been slidably engaged upon the rails 24 and 30 respectively to position the bar 20 across the surface of the work table in parallel relation with the plane of the saw blade 12 and with operating handle 68 and locking lever 48 in the position shown in Figure 4 of the drawings; shaft 136 is first rotated to move the brackets and gauge bar longitudinally along the guide rails and position the bar 20 in predetermined laterally spaced relation from the saw blade. The handle rod 68 is now swung downwardly from the position of Figure 4 to that shown in Figure 3, thus rotating the eccentric 64 in a clockwise direction. In the first portion of this movement of the eccentric, by reason of its contact with the plug 58, the lever 48 is lifted out of contact with pin 54 and is rocked in a clockwise direction against the resistance of spring 76 until the surface 56 on the lever has clamping contact with the surface of guide rail 24 to square the fence with rail 24 and hold the bracket 22 against longitudinal shifting movement thereon from its adjusted position. The upper forked end 132 of lever 48 is thus brought into bearing contact with the inner end of sleeve 124. In the further rocking motion of eccentric 64 with continued axial pressure against the plug 58 in a plane below the guide rail 24 the lever then fulcrums on said rail about the axis thereof and is further moved in the clockwise direction, thus applying axial pressure against the inner end of sleeve 124 and moving the connecting rod 108 to the right. Thus, pivotal motion is transmitted to bell crank lever 94 of the rear locking device in a clockwise direction, and arm 98 of said lever bearing upwardly against pin 102 moves locking rod 86 upwardly against the resistance of spring 104 so that the lower hooked end of said rod is tightly is clamped against the under side of the rail 30 to thus lock the bracket 28 and the rear end of the bar 20 against longitudinal movement on said rail from the adjusted position.

The lost motion connection between the upper end of lever 48 and rod 108 assures the effective operation of the rear locking device only after lateral squaring motion caused by the locking engagement of lever 48 with the front guide rail 24 has ceased so that the initially established parallel relationship between the bar 20 and saw blade 12 will be preserved when both ends of the bar are finally rigidly locked to the respective guide rails. It is to be particularly noted that in the clockwise movement of lever 48 and the actuation of the rear locking device by rod 108, lever 48 is out of contact with the fulcrum pin 54 thus minimizing the manual effort required to rotate eccentric 64 and rock said lever about the axis of guide rail 24.

Figure 3:
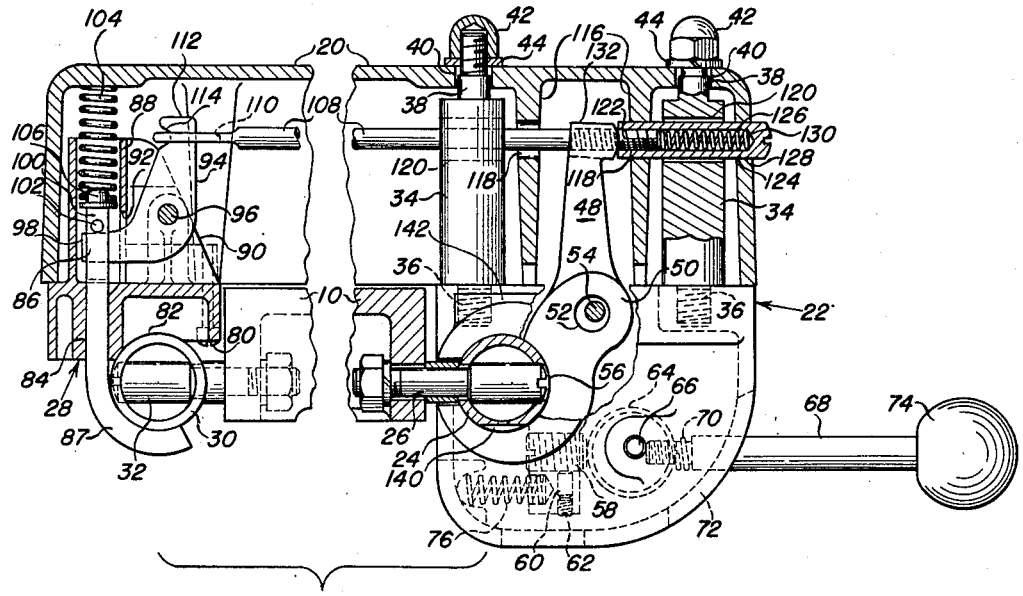
Figure 3 is a side elevation on an enlarged scale, certain parts being shown in section and others broken away and the rip fence or gauge bar being locked at its front and rear ends in adjusted position relative to the machine table.

To release the gauge bar for longitudinal adjustment along the guide rails, the handle rod 68 is swung upwardly from the position of Figure 3 and in the first portion of the counterclockwise rotation of eccentric 64, a substantially simultaneous reaction of the springs 76 and 104 of the front and rear locking devices occurs and spring 76 moves the lower end of lever 48 to the right, maintaining contact of plug 58 with the periphery of the eccentric and disengaging the clamping surface 56 of the lever from the periphery of the rail 24. At the same time, spring 104 of the rear locking device moves the rod 86 downwardly out of clamping engagement with rail 30, and through bell crank lever 94 moves rod 108 to the left. In the further counter-clockwise rotation of eccentric 64, the spring 76 functions independently of spring 104 causing the lower end of lever 48 to fulcrum about the point of contact of plug 58 with the periphery of the eccentric, and thus moving the upper portion of the lever in a counterclockwise direction and finally contacting the hub portion 50 of the lever with the pin 54 as the upper forked end of the lever moves to the left out of contact with the inner end of sleeve 124 to the position seen in Figure 4 of the drawings. In this position, the angle of repose of the lever 48 is such that the surface 56 thereof is in slightly eccentric relation to the peripheral surface of rail 24 and the point of intersection of the axis of plug 58 with the periphery of eccentric 64 is slightly lower than when the lever is in the locking position of Figure 3. Otherwise, it will be noted that horizontal planes intersecting the axes of plug 58 and pin 54 are substantially equidistantly spaced below and above a horizontal plane intersecting the axis of rail 24.

As will be evident from the above description, by rotating the sleeve 124 and adjusting the same axially on the end of rod 108, the inner end of said sleeve may be variably spaced from the end 132 of lever 48 to determine the elapsed time interval between the locking of bracket 22 by said lever to rail 24 and the locking of the rear end bracket 28 to guide rail 30 by the clamping rod 86.

Figure 7:
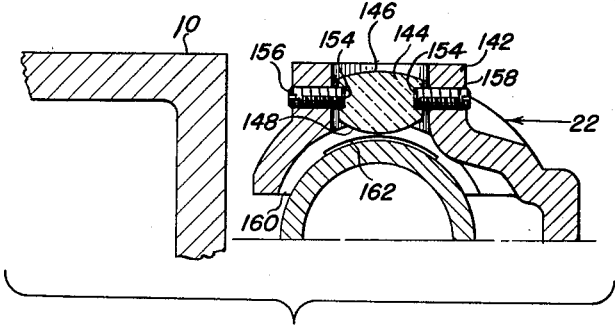
Figure 7 is a sectional view taken substantially on the line 7—7 of Figure 6.
Figure 8:
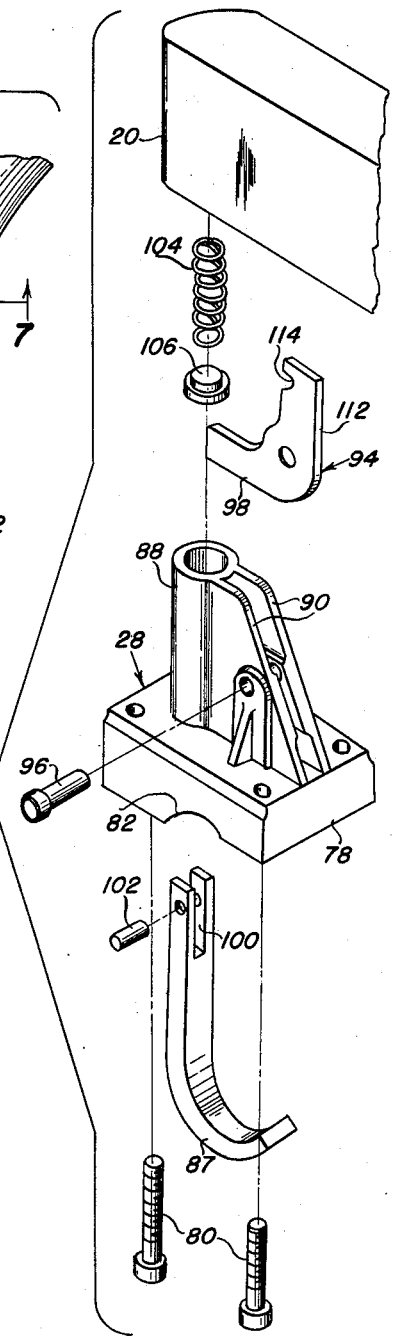
Figure 8 is an exploded perspective view of the adjustable rear end bracket and parts of the locking device associated therewith.

I have also provided improved means associated with the front bracket 22 which enables the operator to rapidly and accurately adjust said bracket along the guide rail to position the fence or gauge bar 20 across the table surface in a desired predetermined spaced relation from the saw blade. To this end, the top of the bracket 22 at one side of the gauge bar 20 and above rail 24 is formed with an upstanding boss 142 which is hollow and preferably elongated longitudinally of the guide rail 24. The upper end face of this boss lies in a plane slightly below the top surface of the table 10 and a magnifying lens 144, also of elongated form, is housed wholly within this hollow boss, said lens having upper and lower convex surfaces 146 and 148 respectively (Figure 7), the latter being centrally provided with a transversely extending hair line 150 and disposed immediately adjacent the scale graduations 152 on the upper surface of rail 24.

The lens block 144 may be formed of cast "Lucite" or other suitable material and the lower curved surface thereof is of major convexity in order to avoid distortion. The opposite side edges of the lens are formed with shallow longitudinally extending grooves 154 and it is adjustably supported in the boss 142, in clearance relation to the opposite side walls thereof, by means of longitudinally spaced adjusting screws 156 threaded in one of said side walls in contact with the base wall of one of the grooves 154 and a single set screw 158 threaded in the opposite side wall of the boss contacting the base wall of the other groove 154, and located in a vertical plane substantially midway between the adjusting screws 156. It will thus be evident that by loosening one of the screws 156 and tightening the other against one end of the lens 144, the lens may be angularly adjusted in a horizontal plane with respect to the walls of the boss 142 and to the longitudinal axis of the rail 24 to accurately position the hair line 150 on the curved surface 148 in parallel relation to the scale graduations 152 on the rail. It will be noted that the lens 144 is disposed wholly below the top surface of boss 142 so that it will not be damaged or scratched by work fed to the saw which at times may rest upon the boss 142.

Preferably the part of the bracket casting overlying rail 24 having the boss 142 formed thereon is provided with internal circumferentially extending ribs 160 at opposite ends of said boss. These ribs, slidably contacting the surface of rail 24, maintain a permanently spaced relationship of the lower curved surface 148 of the lens from the scale graduations 152 on the rail. The lower edge portions of the ribs 160 in alignment with the scale graduations are preferably slightly recessed as at 162 and in clearance relation to the graduated surface of the rail to avoid possible obliteration of such graduations by friction in the longitudinal adjustment of the bracket upon the guide rail 24.

From the foregoing description and the accompanying drawings, it will be seen that the present invention provides an improvement in the rip fence or work gauge assembly of the above mentioned issued patent. It has been found that such improvements contribute to greater ease and rapidity in the assembly and accurate adjustment of the fence or gauge bar and the locking thereof in such adjusted position in rigidly fixed relation to the work table and saw blade. While the present disclosure includes preferred structural examples of the gauge bar and the front and rear end supporting brackets therefor, it will be understood that such disclosure is largely suggestive, and in the application of the present invention to various types of machine tools may require more or less modification as to their component elements as well as the method and means for slidably mounting the brackets on the work table. However, the disclosed construction provides a simple and inexpensive assembly of maximum stability with reliable and efficient operation of the fence locking means.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a work gauge assembly, a gauge bar of inverted U-form in cross-section closed at each end and open for at least a substantial distance at each end of its lower edge, brackets closing the ends of said open lower edge for slidably supporting the ends of said bar upon guides at opposite sides of a machine tool table, a device carried by each bracket to releasably lock said brackets in adjusted position on the respective guides, motion transmitting means operatively mounted in the gauge bar and interconnecting said devices, said means including a rod extending longitudinally within the gauge bar and provided with a slot in one end terminating within said bar, and one of said devices comprises an upstanding, flanged boss carried by its associated bracket and housing a movable clamp member and having an actuating bell crank rocking lever pivotally mounted thereon with one arm engaging said clamp member and the other arm paralleling said boss, whereby said device and its bracket provide a sub-assembly adapting said device to be inserted into the open lower edge of said gauge bar at one end thereof to engage said other arm in the slot in said rod in the assembly of said bracket with the gauge bar.

2. A work gauge assembly as defined in claim 1, wherein said sub-assembly comprises a base formed to slidably engage its associated guide, a vertical cylindrical boss providing an upwardly opening spring confining bore and disposed within the gauge bar and connected by spaced webs with the base to reinforce said cylindrical boss, pivot means carried by said webs supporting said rocking lever and having an arm engaged in said slot of said rod, a spring pressed locking bar vertically movable in said cylindrical boss and operatively connected with said second arm of said lever.

WILLIAM A. ESCHENBURG.

REFERENCES CITED

The following references are of record in the file of this patent:

UNITED STATES PATENTS

| Number | Name | Date |
|---|---|---|
| 354,740 | Rogers | Dec. 21, 1886 |
| 1,090,432 | Vetter | Mar. 17, 1914 |
| 2,043,625 | Lindner | June 9, 1936 |
| 2,111,977 | Lindner | Mar. 22, 1938 |
| 2,265,335 | Aumann | Dec. 9, 1941 |
| 2,325,082 | Tautz | July 27, 1943 |
| 2,556,548 | Modderman | June 12, 1951 |